(12) United States Patent
Kimura et al.

(10) Patent No.: US 8,462,296 B2
(45) Date of Patent: Jun. 11, 2013

(54) PROJECTION-TYPE DISPLAY APPARATUS

(75) Inventors: Nobuyuki Kimura, Yokohama (JP); Koji Hirata, Yokohama (JP); Hidehiro Ikeda, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 203 days.

(21) Appl. No.: 12/898,763

(22) Filed: Oct. 6, 2010

(65) Prior Publication Data

US 2011/0194038 A1   Aug. 11, 2011

(30) Foreign Application Priority Data

Feb. 5, 2010   (JP) .................................. 2010-023911

(51) Int. Cl.
*G02F 1/1335*   (2006.01)

(52) U.S. Cl.
USPC ................................. 349/71; 349/69; 349/70

(58) Field of Classification Search
USPC ....................................................... 349/69–71
See application file for complete search history.

(56) References Cited

U.S. PATENT DOCUMENTS

| | | |
|---|---|---|
| 2009/0262308 A1 | 10/2009 | Ogawa |
| 2009/0284148 A1 | 11/2009 | Iwanaga |

FOREIGN PATENT DOCUMENTS

| | | |
|---|---|---|
| EP | 1605199 | 12/2005 |
| JP | 10-171045 | 6/1998 |
| JP | 2002-268140 | 9/2002 |
| JP | 2004-341105 | 12/2004 |
| JP | 2008-293838 | 12/2008 |
| JP | 2009-251147 | 10/2009 |
| JP | 2009-259583 | 11/2009 |
| JP | 2009-277516 | 11/2009 |
| WO | WO 2006/133214 | 12/2006 |

*Primary Examiner* — Phu Vu
(74) *Attorney, Agent, or Firm* — Antonelli, Terry, Stout & Kraus, LLP.

(57) ABSTRACT

A projection-type display apparatus, being suitable to be applied as a light source of a solid-state light source, in the place of a conventional lamp, comprises: a light source unit, which is configured to emit a white-color light therefrom; a light separation optic system, which is configured to separate the white color light from the light source unit into three primary color lights, R (red-color), G (green-color) and B (blue-color); R, G and B light modulating portions, each of which modulates each of R, G and B polarized lights separated, depending on a video signal, respectively; a light composing unit, which is configured to compose optical images, which are formed by the R, G and B light modulating portions; and a projecting portion, which is configure to project the optical image composed, enlargedly, wherein the light source unit emits a white color light emitting from a nearly point-like light source, including an excitation light from a solid-state light emitting element therein.

20 Claims, 5 Drawing Sheets

FIG. 8A
WHEN THERE IS NO RECESS PORTION

FIG. 8B
WHEN THERE IS RECESS PORTION

FIG. 9

PROJECTION-TYPE DISPLAY APPARATUS

This application relates to and claims priority from Japanese Patent Application No. 2010-023911 filed on Feb. 5, 2010, the entire disclosure of which is incorporated herein by reference.

BACKGROUND OF THE INVENTION

The present invention relates to a projection-type display apparatus of projecting an optical image, which is formed by modulating light intensity of lights from a light source depending on a video signal, by means of a transmission-type or a reflection-type liquid crystal panel, or a digital mirror device (DMD) aligning plural numbers if micro mirrors, etc., and in particular, it relates to a projection-type display apparatus being suitable for applying therein a solid-state light source as a light source thereof.

A projection-type display apparatus is already known, for example, in Japanese Patent Laying-Open No. Hei 10-171045 (1998), which stores an optical unit for modifying intensity of the lights from a light source depending on a video signal by means of a light valve, thereby projecting the formed optical image, enlargedely, together with a driver circuit, a power source circuit, a cooling fan, etc., within a housing thereof.

In such conventional projection-type display apparatus, in particular, for the purpose of maintaining a sufficient brightness on a projection surface, there is mainly applied a super or ultra high-pressure mercury lamp, as the light source thereof, having high efficiency per an electric power inputted (for example, 70 lm/W), normally, in a lighting optic system.

However, when applying a discharge lamp, generating a white light therefrom, it is necessary to provide a high-voltage power source, causing a difficulty in handling thereof, and also since it is short in the lifetime thereof and low in the shock-resistance thereof, therefore, in the place thereof, ideas or proposals are made, variously, of applying the solid-stake light source, such as, the light emitting diode and/or the laser diode, etc., as the light source of the projection-type display apparatus.

For example, in Japanese Patent Laying-Open No. 2002-268140 (2002) is proposed a projection-type display apparatus, disposing sheet-like light sources, each aligning light emitting diodes emitting a light, one of three (3) primary colors; i.e., red (R), green (G) and blue (B), in an array-like manner, behind a light modulator (i.e., the light valve) corresponding to R, G or B.

Also, in Japanese Patent Laying-Open No. 2004-341105 (2004) is already known a projection-type display apparatus, applying a light emitting diode for generating ultraviolet (UV) rays therefrom, being a solid-state light source, as the light source of the projection-type display apparatus, wherein those UV rays are irradiated on a color wheel, which is made from fluorescent substance layers of R, G and B, successively, thereby to converted them into R-light, G-light and B-light, and each of those color lights is projected, successively, through a space modulator, enlargedly by means of a projection lens, thereby displaying an optical image.

And, in Japanese Patent Laying-Open No. 2009-277516 (2009) is already proposed that applying a light emitting diode or a laser light emitting device for generating a light of blue (B) color, in the place of the light emitting diode for generating a light with using the UV rays mentioned above as excitation lights thereof, for the purpose of avoiding injury or damage due to the UV rays, and thereby maintaining a long life-time of optical parts. Further, in Japanese Patent Laying-Open No. 2009-259583 (2009) is disclosed the structure for dissolving shortage of an amount of lights from the light emitting diodes of green (G) color, in particular, in case where plural numbers of light emitting diodes are applied and the light rays emitted therefrom are condensed to be used. Thus, there is proposed a light source device having a third light source for composing a light (i.e., an excitation light) from the light emitting diode of B-color for the light from the light emitting diode of G-color, by means of a dichroic mirror, and for passing the G-light therethrough, and being excited by absorbing the B-light, thereby generating the G-light.

SUMMARY OF THE INVENTION

As was mentioned in the above, since the super high-pressure mercury lamp generates a large amount of the UV rays, therefore it gives a large stress upon the parts which are made up with organic materials, such as, a liquid crystal valve and a polarizing plate, etc., building up the lighting optic system, in particular, and for that reason, the life-times of those parts are detracted from. Also, the lamp itself brings about lowering of brightness due to abrasion of electrodes and/or cloudiness of a light emitting tube, in a relatively short time period. Further, it has a problem of difficulty in disposal of waste matter thereof, etc., because it contains mercury therein. And, as was mentioned above, though various kinds of the light sources are proposed for the projection-type display apparatus, applying the light emitting diodes and/or the laser diodes therein, in the place of such super high-pressure mercury lamp, in the Patent Document(s) mentioned above; however, in particular, the light source for the projection-type display apparatus has the following problems.

Thus, the projection-type display apparatus enlarges and projects the optical image, which is formed with modification of light intensities of the white color light from a point-like light source having high light emitting efficiency, such as, the super high-pressure mercury lamp, representatively, depending on the video signal, by means of a liquid crystal panel of the transmission-type or the reflection type, or the digital mirror device (DMD) aligning plural numbers of micro mirrors, or the like (in an optical element portion). On the contrary to this, the light source devices (i.e., the solid-state light sources), which are proposed by the conventional arts including the Patent Documents mentioned above, do not necessarily provided a light source being suitable for the projection-type display apparatus. Thus, the light obtainable from the light source devices according to the conventional arts mentioned above are collection or assemblage of lights from a large number of solid-state light sources, which are disposed integrally within a relatively large area, and for that reason, it does not build up a point-like light source of white color light having a necessary amount or intensity of lights, and therefore, in case of applying the solid-state light source mentioned above in the place of the mercury lamp of the conventional art, it is impossible to obtain sufficient powers or performances in a part of an optical system including the light intensity modulator portion, and this may results into a reason of generating deterioration of white-balance and/or color shading on a projection surface.

Then, according to the present invention, it is accomplished by taking the problem(s) of the conventional technologies mentioned above into the consideration thereof, and further in more details thereof, an object thereof is to provide a projection-type display apparatus being suitable for applying therein a solid-state light source as a light source thereof.

According to the present invention, for accomplishing the object mentioned above, first of all, there is provided a projection-type display apparatus, comprising: a light source unit, which is configured to emit a white-color light therefrom; a light separation optic system, which is configured to separate the white color light from said light source unit into three primary color lights, R (red-color), G (green-color) and B (blue-color); R, G and B light modulating portions, each of which modulates each of R, G and B polarized lights separated, depending on a video signal, respectively; a light composing unit, which is configured to compose optical images, which are formed by said R, G and B light modulating portions; and a projecting portion, which is configure to project said optical image composed, enlargedly, wherein said light source unit emits a white color light emitting from a nearly point-like light source, including an excitation light from a solid-state light emitting element therein.

Also, according to the present invention, within the projection-type display apparatus, as described in the above, it is preferable that the white color light emitting from said light source unit includes an excitation light and an emission light from a fluorescent substance, which is excited by said excitation light, or alternately that said fluorescent substance emits a light flux of a region of wavelength in relation to a complementary color for the white. Further, it is preferable that said excitation light is B-color light and said emission light from said fluorescent substance is Y-color light. And, further, it is preferable that the white color light emitting from said light source unit is produced, by exchanging a laser beam between the B-color light from said semiconductor laser element and the Y-color light emitting from said fluorescent substance, in a time-sharing manner, successively, to be combined with in color thereof.

And, according to the present invention, within the projection-type display apparatus, as described in the above, it is preferable that, further, the white color light emitting from said light source unit is nearly parallel light, and further that the white color light emitting from said light source unit is aligned into a predetermined direction on the polarization plane thereof. And, it is preferable that a means is further provide on an output side of the light source unit, for aligning the polarization plane of the white color light emitting from said light source unit.

In addition to the above, according to the present invention, within the projection-type display apparatus, as described in the above, it is preferable that said R, G and B light modulating portions, each of which modulates each of R, G and B polarized lights separated from the white light emitting from said light source unit, depending on the video signal, are transmission-type liquid crystal panels, or reflection-type liquid crystal panels, or digital mirror devices (DMD), each being made by aligning plural numbers of micro-mirrors.

According to the present invention mentioned above, it can be easily applied into the projection-type display apparatus, by replacing with the solid-state light emitting source, i.e., applying the solid-state light source as the light source in the lighting optic system, in particular, within the projection-type display apparatus, and also there can be obtained sufficient performances in the optical parts thereof, even with applying the solid-state light source as the light source; i.e., it is possible to provide the projection-type display apparatus, being improved much more than the conventional art, against generation of deterioration of white-balance and/or color shading on a projection surface.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE PREFERRED EMBODIMENTS

Hereinafter, embodiments according to the present invention will be fully explained by referring to the attached drawings. However, in each of the drawings, the same reference numerals are given to the constituent elements having the common functions.

First of all, mentioning will be made on a projection-type display apparatus according to an embodiment, by referring to FIG. 1 attached herewith. However, this figure shows the entire structures of the projection-type display apparatus, according to the present embodiment, and in particular, the device that executes the modification of light intensity depending on a video signal, by means of, so-called a transmission-type liquid crystal panel. Also, in this figure, when distinguishing an element disposed on an optic path of each color light from others, it will be shown with adding R, G or B presenting a light color after the reference numeral thereof (i.e., an index), and when there is no necessity of making distinction among them, the index will be omitted therefrom. In addition thereto, in this figure will be introduced, so-called local right-hand rectangular coordinates, for the purpose of presenting the polarization direction clearly. Thus, while assuming that an optical axis 101 is a Z-axis, within the surface perpendicular to the Z-axis, an axis parallel with a paper surface of FIG. 16 is defined to be a Y-axis, and an axis directing from a reverse surface of the paper of the figure to a front surface thereof is defined to be an X-axis. The direction parallel with the X-axis is called "X-direction", and the direction parallel with the Y-axis is called "Y-direction", respectively. A polarized light, which is polarized into the X-direction in the polarization direction thereof, is called "X-polarized light", and a polarized light, which is polarized into the Y-direction in the polarization direction thereof, is called "Y-polarized light", respectively.

Figure 1:
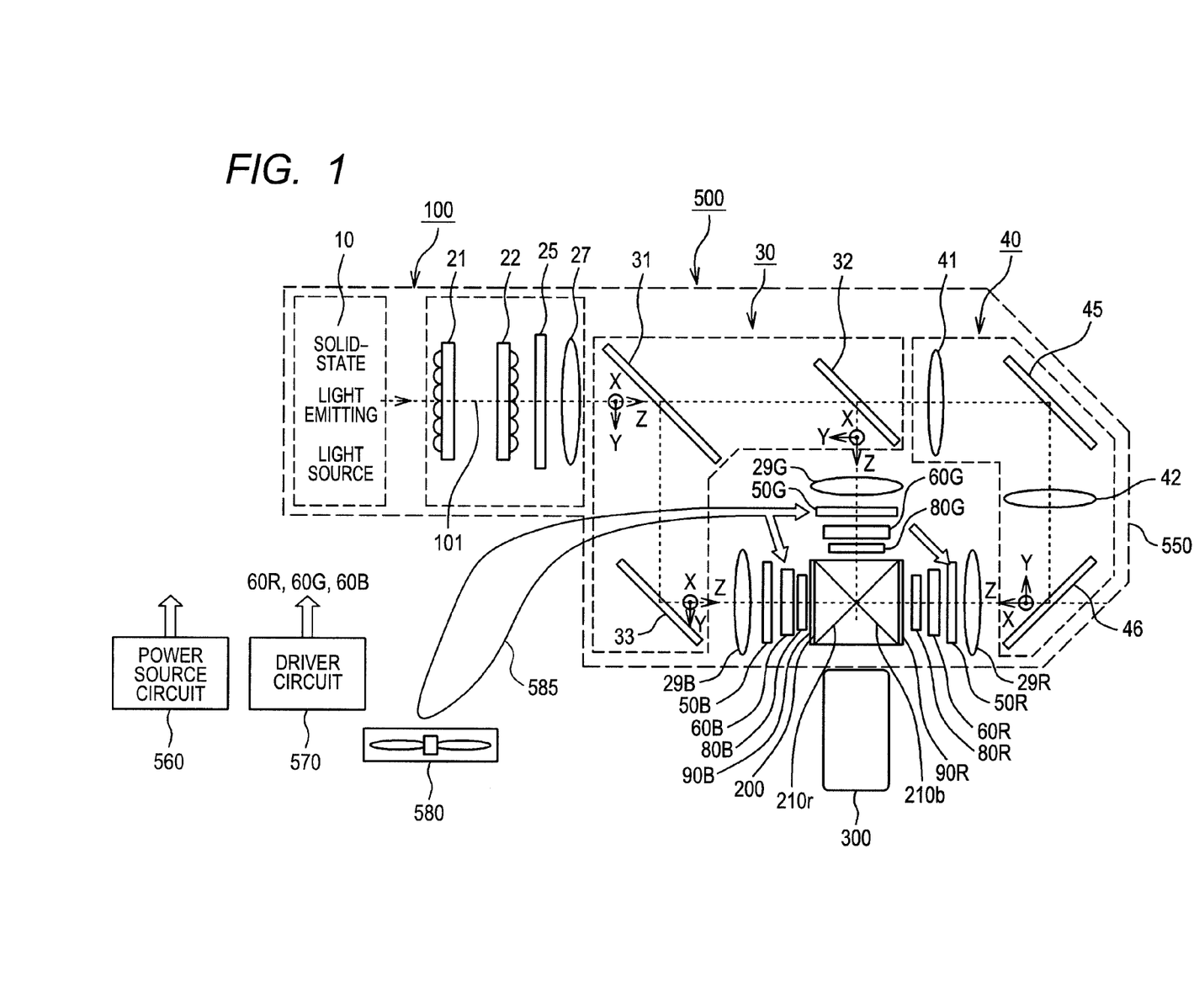
FIG. 1 is a view for showing the entire structures of a projection-type display apparatus.

In FIG. 1, an optic system of the projection-type liquid crystal display apparatus comprises a lighting optic system 100, a light separation optic system 30, a relay optic system 40, three (3) sets of field lenses 29 (29R, 29G and 29B), three (3) sets of transmission-type liquid crystal panels 60 (60R, 60G and 60B), a light composing prism 200 as a light composing means, and a projection lens 300 as a projecting means. The liquid crystal panel has incident side polarizing plates 50 (50R, 50G and 50B) on a side of light incident, and emission side polarizing plates 80 (80R, 80G and 80B) on a side of light emission. Those optical elements are mounted on a base 550, thereby building up the optic unit 500. Also, the optic unit 500 is installed in a housing not shown in the figure, together with a driver circuit 570 for driving the liquid crystal panel 60, a cooling fan 580 for cooling down the liquid crystal panel 60, etc., and a power source circuit 560 for supplying an electric power to each circuit; thereby building up the projection-type display apparatus.

Hereinafter, detailed explanation will be made on each of the portions building up the projection-type display apparatus mentioned above. First, the lighting optic system 100, for irradiating lights upon the liquid crystal panel 60, equally, though the detailed explanation thereof will be given hereinafter, it includes a light source unit 10, being made up with solid-state light emitting elements, each emitting practically or nearly white color lights therefrom, a first array lens 21 and a second array lens 22 building up an optical integrator, a polarized light converter element 25, and a condenser lens (a pileup lens) 27 therein.

The light separation optic system 30, for separating the nearly white color light from the lighting optic system 100 mentioned above into three (3) prime colors, includes two (2) sets of dichroic mirrors 31 and 32, and reflection mirror 33, for changing the direction of an optical path. Also, the relay optic system 40 includes a first relay lens 41, as a field lens, a second relay lens 42, as a relay lens, and two (2) sets of reflection mirrors 45 and 46 for changing the direction of an optical path.

In the structures mentioned above, from the light source unit 10 made up with the solid-state light emitting elements are emitted light rays almost parallel with the X-axis shown by a broken line in the figure. And, the lights emitting from this light source unit 10 are incident upon or enter into the polarized light converting integrator. However, this polarized light converting integrator includes, as is shown in the figure; i.e., the optical integrator made up with the first array lens 21 and the second array lens 22, for obtaining the uniform lighting, and the polarized light converter element 25 made up with the polarized beam splitter array, for converting the lights into a linearly polarized light by aligning the polarization directions thereof into a predetermined polarization direction. Thus, in the polarized light converting integrator mentioned above, the lights from the second array lens 22 are aligned, by the polarized light converter element 25, into a predetermined direction in the polarization direction thereof; for example, X-polarized light of the linearly polarized light (i.e., a light in the X-direction, having polarization direction perpendicular to the paper surface of FIG. 1 within the plane perpendicular to the optical axis 101).

And, a projection image of each of lens cells of the first array lens 21 is piled up on each liquid crystal panel 60, respectively, by means of the condenser lens 27, the field lenses 29G and 29B, the relay optic system 40, the field lens 29R. In this manner, it is possible to light up or illuminate the liquid crystal panel, equally, while aligning the lights from the lamp (i.e., the light source), at random in the polarization directions thereof, into the predetermined direction of polarization (herein, the X-polarized light).

On the other hand, the light separation optic system 30 separates the nearly white light emitted from the lighting optic system 100 into the three (3) primary colors of the lights, i.e., B-light (the light of a blue color band), G-light (the light of a green color band) and R-light (the light of a red color band), and they are guided into optical paths (i.e., B-light path, G-light path and R-light path) directing to the corresponding liquid crystal panels, respectively. Thus, the B-light reflecting on the dichroic mirror 31 is further reflected upon the reflection mirror 33, and after passing through the field lens 29B and the incident side polarizing plate 50B, they are incident upon or enter into the liquid crystal panel 60B for use of the B-light (the B-light path). Also, the G-light and the R-light, after passing through the dichroic mirror 31, are separated into the G-light and the R-light by means of the dichroic mirror 32. The G-light is reflected on the dichroic mirror 32, and after passing through the field lens 29G and the incident side polarizing plate 50G, it is incident upon or enters into the liquid crystal panel 60G for use of G-light (the G-light path). The R-light passes through the dichroic mirror 32, and is incident upon or enters into the relay optic system 40.

The R-light incident upon the relay optic system 40, after passing through the reflection mirror 45 by means of the first relay lens 41 of the field lens, is condensed (or, focused) in the vicinity of the second relay lens 42, and is scattered directing to the field lens 29R. And, it is brought to be almost parallel with the optical path by means of the field lens 29R, and after passing through the incident side polarizing plate 50R, it is incident upon or enters into the liquid crystal panel 60R for use of the R-light (the R-light path).

Following to the above, each liquid crystal panel 60 (60R, 60G or 60B), building up the light intensity modulator portion, is driven by the driver circuit 570, and the degree of polarization thereof is increased by the incident side polarizing plate 50 (50R, 50G or 50B) having a transmission axis in the X-direction, and it modulates the color lights of the X-polarization incident upon or entering from the light separation optic system 30 (i.e., the light intensity modulation) depending on a color video signal shown in the figure; thereby forming an optical image of the Y-polarization of each color light.

The optical image of the y-polarization of each color light, which is formed in such a manner, as was mentioned above, is incident upon the emission side polarizing plates 80 (80R, 80G and 80B). The above-mentioned emission side polarizing plates 80R, 80G and 80B are those having the transmission axis thereof in the Y-direction. With this, unnecessary components of the polarized lights herein, the X-polarized light) are removed from, and thereby a contrast thereof is increased.

The optical image of the Y-polarization of each color light, which is formed in such a manner, as was mentioned above, is incident upon the light composing prism 200, as the light composing means. In this moment, the optical image of the G-light is incident upon, remaining as the Y-polarization (i.e., P-polarization with respect to a dichroic film surface of the light composing prism 200). On the other hand, on the B-light path and the R-light path, since ½λ wavelength plates 90B and 90R are provided between the emission side polarizing plates 80B and 80R and the light composing prism 200, the optical images of the B-light and the R-light of the Y-polarization are converted into the optical images of the X-polarization (i.e., S-polarization with respect to the dichroic film surface of the light composing prism 200, for conducting the color composing thereof), and thereafter, they are incident upon the light composing prism 200. This is because of taking the spectral characteristics of the dichroic coat 210 into the consideration thereof; i.e., by conducting so-called SPS composition with bringing the G-light into the P-polarized light while the R-light and the B-light into the S-polarized light, for conducting the light composing with high efficiency.

Following to the above, the light composing prism 200 is made up with a dichroic coat (dielectric multi layers) 210b reflecting the B-light thereon and a dichroic coat (dielectric multi layers) 210r reflecting the R-light thereon are formed on the boundary surfaces of four (4) pieces of rectangular prisms, in an X-like (or, a cross-like) manner. Among three incident surfaces of the light composing prism 200, the B-light and the R-light entering into the incident surfaces opposing to each other (i.e., the S-polarized light with respect to the dichroic coat surface) are reflected upon the dichroic coat 210b for use of the B-light and the dichroic coat 210r for use of the R-light, respectively, which are crossing with each other. Also, the G-light entering into a central incident surface (i.e., the P-polarized light with respect to the dichroic coat surface) propagates straight ahead. Those optical images of the color lights are optically composed with, and a color image light (composed light) is emitted from the emission surface.

And, the composed light emitting from the light composing prism 200 mentioned above is projected on a screen (not shown in the figure) of the transmission type or the projection type, through a projection lens 300, like a zoom lens, for example, and thereby a picture enlargedly projected is displayed thereon. However, the cooling fan 580 mentioned above makes ventilation, in particular, for the parts, which are heated by the light of high intensity from the light source unit 10, or need cooling thereof, for example, the incident side polarizing plate 50, the liquid crystal panel 60, the emission side polarizing plate 80, etc., among various kinds of parts building up the projection-type display apparatus mentioned above, through a flow passage 585, which is formed directing to those parts. Thus, apart of the irradiation lights from the light source unit 10 is absorbed therein, and thereby cooling down the heat generated due to that.

However, in the embodiment mentioned above, thought there is shown the example of building up the light intensity modulator portion with three (3) transmission-type liquid crystal panels 60 (60R, 60G and 60B); however, the present invention should not be limited to this, and that light intensity modulator portion may be constructed with the reflection-type liquid crystal panels, or the digital mirror device (DMD) aligning plural numbers of micro mirrors, etc.

Following to the above, explanation will be given hereinafter, on the details of the light source unit (the solid-state light source device) 10 made up with the solid-state light emitting elements, for emitting light rays of the white color light almost parallel with the optical axis 101, in the projection-type display apparatus, the structures thereof being explained in the above, in particular, in the lighting optic system 100 thereof.

Figure 2:
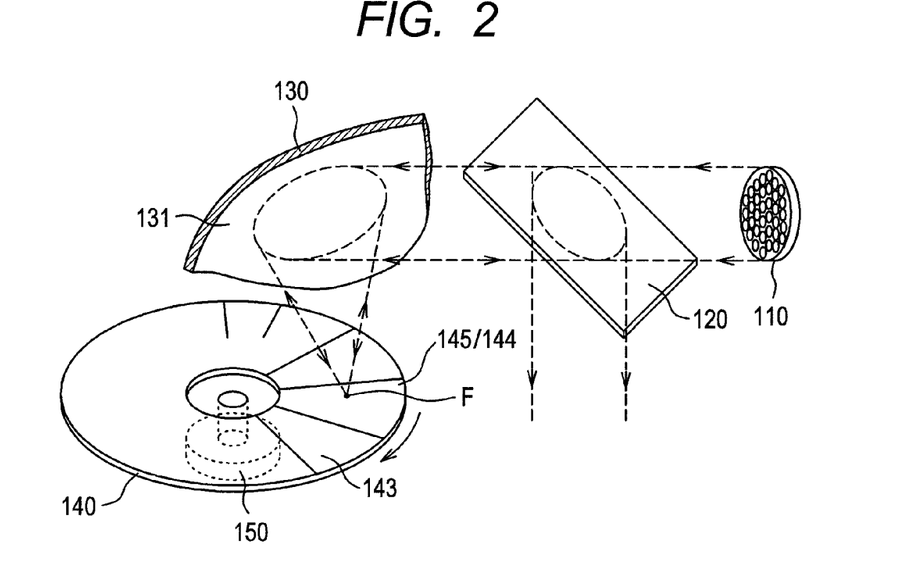
FIG. 2 is a view for explaining about the details of the structures and the principle of a light source unit (i.e., a solid-state light emitting source), within the projection-type display apparatus.
Figure 3:
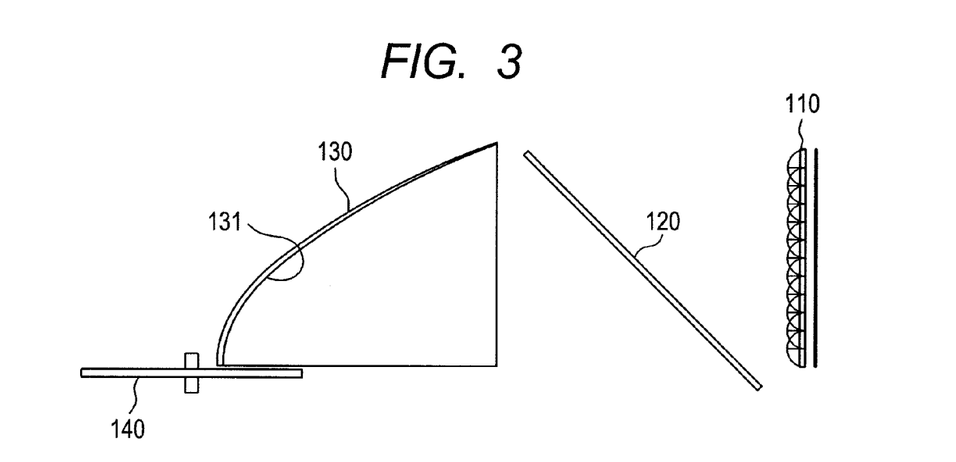
FIG. 3 is a vertical cross-section view of the light source unit (i.e., the solid-state light emitting source)

FIG. 2 attached herewith is a view for explaining the principle of the light source unit 10, according to an embodiment of the present invention (an embodiment 1). As is apparent from the figure, that unit 10 comprises a semiconductor laser element group 110, aligning plural numbers of semiconductor laser elements or light emitting diodes, each emitting a light of blue color band (B-color), on an almost disc-like substrate, as a light emitting source of the solid-state elements, a separation mirror 120 disposed inclining at an angle of about 45 degree, facing to a laser beam emitting surface of the semiconductor laser element group 110 mentioned above, a reflection mirror (a reflector) 130 having a parabolic surface, for example, which is disposed at a position facing to that laser beam emitting surface of the semiconductor laser element group 110 mentioned above, a disc (or wheel) member 140 rotating round in the vicinity of a focus point (F) of that reflection mirror, and a driving means for rotationally drive that disc (or wheel) member 140 at a rotation speed desired, for example, an electromotive motor 150. However, the vertical cross-section of this light source unit 10 (but, excepting the electromotive motor 150) is shown in FIG. 3 attached herewith.

In the structures of the light source unit 10 mentioned above, firstly will be given an explanation on the semiconductor laser element group 110, for generating excitation lights. As will be apparent from the explanation given hereinafter, as a light source for generating the excitation lights, although the solid-state light emitting element, such as, the light emitting diode or the laser light source is superior, for example, however, in general, since the laser having a high output is expensive, then it is preferable to use plural numbers of semiconductor laser elements of the blue color laser in combination, as was mentioned above, as an excitation light source. In particular, because of that it belongs to the blue color band in the visible ray region, that it has a high-energy efficiency, that it has a narrow band, and further that it has a single polarization, it is preferable to use a blue color laser beam, and in the present embodiment, a large number of the semiconductor laser elements, each emitting the light of the blue color band (B-color) are aligned on the substrate having the disc-like shape, as was mentioned above, a rectangular shape, or a polygonal shape, for example; thereby building up the semiconductor laser element group 110. Also, those semiconductor elements of large number thereof are so disposed that the beams emitting from the light emitting surfaces of those are aligned into a predetermined direction in a plane of polarization thereof.

Figure 4:
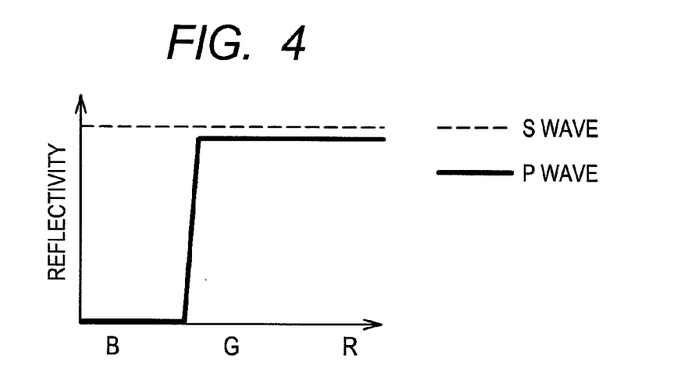
FIG. 4 is a view for showing an example of characteristics of a separation mirror, which builds up the light source unit (i.e., the solid-state light emitting source)

Next, the separation mirror 120, which is obliquely disposed facing to the laser light emitting surface of the semiconductor laser element group mentioned above, as will be apparent from the explanation that will be given hereinafter, passes the blue color laser beams emitting from the semiconductor laser element group and aligned the plane of polarization thereof into the predetermined direction therethrough, directing to the reflection mirror (the reflector) 130, and it also receives them from the reflection mirror (the reflector). With the lights having the plane of polarization in the direction perpendicular to that plane of polarization, this mirror has a function of reflecting them thereupon. Further, an example of the characteristics of this separation mirror 120 will be shown in FIG. 4 attached herewith.

Further, the reflection mirror (the reflector) 130 defines a reflection mirror (surface) 131 having a parabolic surface, which can be obtained by rotating a parabola, or a curved surface based on that parabolic surface or an oval surface, which can be obtained by rotating an oval, on an inner surface side thereof. Further, through will be mentioned later, the blue color laser beams emitting from the semiconductor laser element group 110 and passing through the separation mirror 120, as was mentioned above, are reflected upon the reflection surface on the inner surface side of this reflection mirror (the reflector) 130, and are condensed to the vicinity of the focus point thereof (shown by "F" in FIG. 2 mentioned above). Also, the mirror reflects the lights emitting from the vicinity of that focus point to be parallel lights, directing to the separation mirror 120 mentioned above.

Figure 5A:
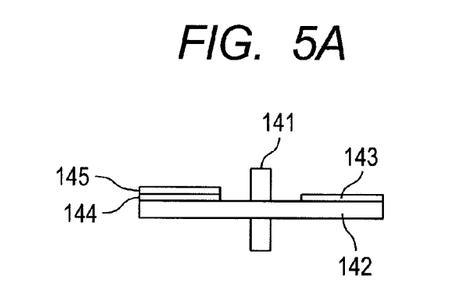
FIGS. 5A and 5B are views for showing the detailed structures of a disc (or wheel) member, which builds up the light source unit (i.e., the solid-state light emitting source)
Figure 5B:
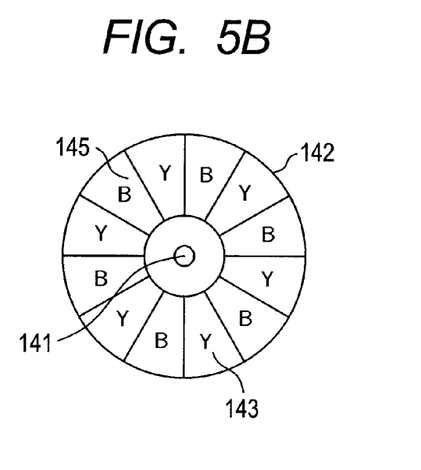

And, in FIGS. 5A and 5B attached herewith are shown the details of the disc (or wheel) member 140 mentioned above.

However, FIG. 5A shows a side-surface cross-section view of the disc (or wheel) member 140, and FIG. 5B shows an upper view thereof.

As is apparent from those figures, this disc (or wheel) member 140 has a rotation shaft 141 at a central portion thereof, for a rotational driving, and a disc-like shaped base member 142, as well. And, on the surface of the disc-like base member 142, rotation of which is controllable, there are provided plural numbers (12 pieces in the present example) of segment regions. Those plural numbers of segment regions can be divided into two (2) regions. On one segment region (shown by "Y" in FIG. 5B) is provided a fluorescence surface 143 made from a fluorescence layer, receiving an excitation light (blue color (B) laser beam) of the visible ray region and emitting a light of a predetermined region of wavelength band therefrom, while on other segment region is provided a reflection surface 144 for reflecting/scattering the excitation light, and further thereon is provided a penetration film 145, as a phase conversion means for shifting the phase of the excitation light by only ¼ wavelength (¼λ) (shown by "B" in FIG. 5B), covering on that surface thereof. And, with rotation of this base element 142 at a predetermined speed, the excitation light reflected upon the reflection mirror (the reflector) 130 and condensed at the vicinity of the focus point "F" results to be incident or enter onto the fluorescence surface 143 (Y) and the reflection surface 144 covered with the penetration film 145 on the surface thereof, alternately, as is shown by a circle of thick line in FIG. 5B. As a result thereof, from the disc (or wheel) member 140 mentioned above can be taken out a ray of light emitting from the fluorescent substance and the excitation light scattering/reflecting upon the reflection surface 144 of the base member 142, in a time-sharing manner.

Figure 6:
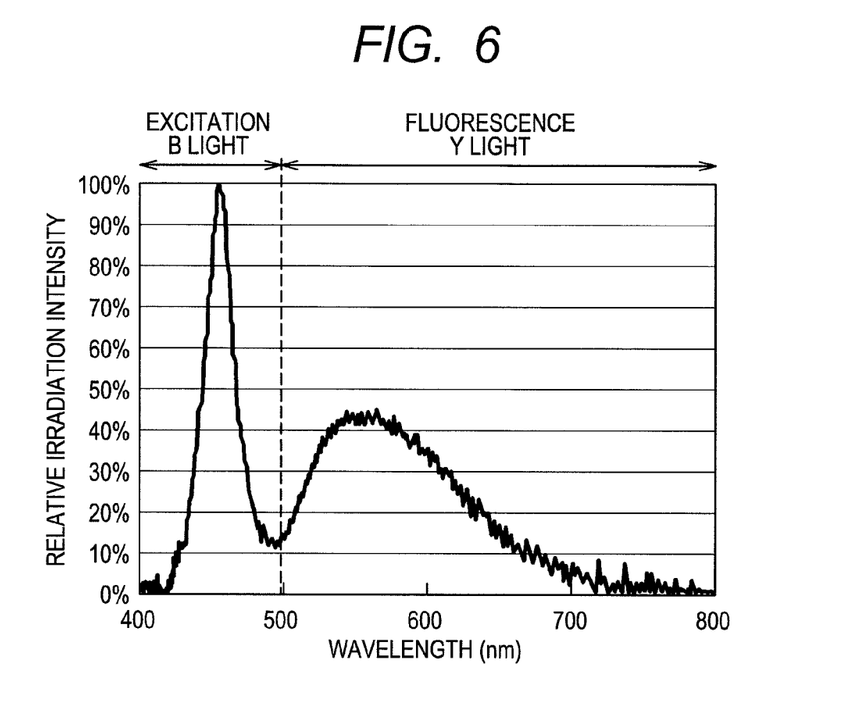
FIG. 6 is a view for showing an example of relationship between an excitation light, which is reflected upon the disc (or the wheel) member, and a fluorescence light generating due to that excitation.

However, as the fluorescent substance to be applied to form the one segment region "Y" on the base member 142 mentioned above, i.e., the fluorescent substance, being excited by the excitation light of the blue region and emitting the light therefrom, it is common to use YAG fluorescent substance $((Y,Gd)_3(Al,Ga)O_{12}:Ce_{3+})$, emitting a yellow light at high efficiency having a complementary color relationship for the blue light. However, according to the present invention, it should not be limited to this, but may be other than that, as far as it is excited and by the excitation light of the blue region and thereby emitting the yellow light therefrom. Further, as to the excitation light of this blue color region and the fluorescent substance of Y-color, being excited by that excitation light and emitted therefrom, an example of the relationship between the wavelength and the intensity of those will be shown in FIG. 6 attached herewith.

Also, since the fluorescent substance is excited by the excitation light and generates heats therefrom, then as the disc-like base member 142 forming that fluorescent substance on the surface thereof, it is preferable to use a material having high thermal conductivity. For example, with using crystal or sapphire, or metal, having the thermal conductivity equal to or higher than $5/W \cdot m^{-1} \cdot K^{-1}$, it is possible to make cooling with preferable efficiency, and as a result thereof, it is effective to increase an efficiency of light emitting of the fluorescent substance and also for a long lifetime thereof.

Following to the above, explanation will be made hereinafter, on operations of the light source unit 10, the detailed structures of which were explained in the above, i.e., the operation of emitting a light beam or flux of the white color light therefrom, nearly in parallel with the optical axis 101, within the lighting optic system 100 of the projection-type display apparatus.

Again, explaining by referring to FIG. 2 mentioned above, the light of the blue color band (B-color) from the semiconductor laser element group 110, aligning the plane of polarization thereof into the predetermined direction, passes through the separation mirror 120, directing to the reflection mirror (the reflector) 130, and is reflected upon the reflection mirror (surface) 131 on the inner surface side thereof; thereby being focused in the vicinity of the focus point "F" thereof. The light of the blue color band (B-color) focused in the vicinity of the focus point "F", accompanying rotation of the disc (or wheel) member 140, is incident upon or enters onto the fluorescence surface 143 (Y) and the reflection surface 144 (B), which are formed on the surface of the disc-like base member 142 building up that member, sequentially. As a result of that, the light of the blue color band (B-color) is received on the layer of the fluorescent substance as the excitation light, on the fluorescence surface 143 mentioned above, and is converted to the fluorescent light, i.e., the yellow color light; thereby emitting the light. On the other hand, it is reflected/scattered on the surface thereof, on the reflection surface 144 (B) mentioned above, and this is repeated, continuously. However, in this instance, since the light, being incident upon the reflection surface 144 (B) and thereby being reflected/scattered on the reflection surface thereof, passes through the penetration film 145 covering on the surface thereof, as the phase converting means for shifting the phase by ¼ wavelength (¼λ), two (2) times, therefore the plane of polarization thereof is changed by 90 degree only (i.e., the phase is shifted only by ½ wavelength (½λ)).

And, as was mentioned above, the light (i.e., the yellow color light), emitting from the fluorescence surface 143 of the disc (or wheel) member 140, and the B-color light, e.g., the reflection light from the reflection surface 144 (B) thereof are directed to the reflection mirror (the reflector) 130 mentioned above, again, and they are reflected upon the reflection mirror (surface) 131 on the inner surface side thereof, to be directed to the separation mirror 120, again, in the form of a parallel light beam or flux. Further, this separation mirror 120, as was mentioned above, reflects the B-color light, the polarization of which is changed by means of the penetration film 145 only by 90 degree. Also, the light (i.e., the yellow color light) emitting from the fluorescence surface 143 reflects the separation mirror 120, in the similar manner. As a result of that, the B-color light as the excitation light and the yellow color light from the fluorescence surface are mixed accompanying with the rotation of the disc (or wheel) member 140 mentioned above, and come to a light having almost while color. Thus, by means of the light source unit 10 mentioned above, an illuminating light of the white color can be obtained, being incident upon the lighting optic system 100 of the projection-type display apparatus, emitting from the reverse surface of the separation mirror 120 (i.e., the surface opposite to the surface, on which the polarized light from the semiconductor laser element group 110 is incident upon or enters) towards a down direction in FIG. 2.

As further other method thereof, it is also possible to obtain the similar effect by providing a permeable window or an opening portion in a part of the reflection mirror (or surface) 131 mentioned above, thereby collecting the excitation lights at a focus point of the reflection surface, through optical fibers, etc. As a result of this, similar to the first method mentioned above, the excitation lights and the emission light beams are mixed with; thereby becoming nearly white in the color thereof.

As was mentioned above, with the light source unit 10, according to one embodiment of the present invention, it is possible to obtain a white color light source, through color mixing due to afterglow or persistence by emitting the light beam or flux of the predetermined wavelength band emitting from the fluorescent substance (i.e., the yellow color light) and the excitation (blue color) light beam or flux reflected/scattered on the reflection surface, sequentially, exchanging between them. In more details, a member, which builds up the light source unit 10, in particular, the disc (or wheel) member 140 having the reflection surface for reflecting the excitation light thereupon, is rotated at high speed, together with the fluorescence surface for converting the yellow color light into the yellow color light; i.e., exchanging the segment, upon which the excitation light is incident, sequentially, thereby obtaining the white color light. With this, that unit 10 can be applied as the lighting optic system.

And, in particular, for the white color light source to be applied in the lighting optic system 100 of the projection-type display apparatus, it is important to emit the light beam or flux, which is obtained from a point-like light source. Thus, in a general projection-type display apparatus of the conventional art mentioned above, as the light source thereof is mainly adopted the super or ultra high-pressure mercury lamp having high efficiency per an electric power inputted, and in that case, a filament of that lamp built up a point-like light emitting source, and the white color light as the light source is obtained, by brining the lights from such point-like light emitting source into the parallel lights. For that reason, within the projection-type display apparatus, as was mentioned in the conventional technology of the present specification, the optic system for producing a desired image or picture upon the white color light from the lighting optic system 100, including the light intensity modulating portion, and also including the light separation optic system 30 and the relay optic system 40, etc., for example, it is designed upon basis of the parallel lights obtainable from such point-like light emitting source. For that reason, in case of adopting the light source of disposing the large numbers of light emitting diodes or the semiconductor laser elements including R, G and B on a plane, then sufficient performances cannot be obtained in the portions of the optic systems, and there is a problem of generating deterioration of white-balance and/or color shading on a projection surface.

For such problem, with the light source unit 10 motioned above, according to the one embodiment of the present invention, as is apparent from the structures thereof, the excitation (blue color) lights from the semiconductor laser element group 110 are focused at the focus point "F" thereof by the reflection mirror (the reflector) 130, and are converted into the yellow light or reflected, as a point-like light, upon the fluorescence surface and the reflection surface of the disc (or wheel) member 140. With this, the white color light obtained from the light source unit 10, according to the embodiment of the present invention, comes to be the light beam or flux obtained from the point-like light source, in the similar manner to that of the mercury lamp as was mentioned above. For that reason, the light source unit 10, according to the embodiment of the present invention, can be adopted as it is, even into the conventional projection-type display apparatus, but excepting only the lighting optic system; i.e., being advantageous. However, in such case, in addition to a long lifetime and an increase of the shock-resistance thereof, due to adoption of the solid-state light source, such as, the light emitting diodes and the laser diodes or the like, and further since there is no necessity of proving high-voltage power source(s) necessary with applying the discharge lamp therein, therefore it is advantageous from a viewpoint of reducing manufacturing costs of products.

Further, in FIGS. 7A and 7B and FIGS. 8A and 8B attached herewith is shown other example (a variation) of the disc (or wheel) member 140 mentioned above.

Figure 7A:
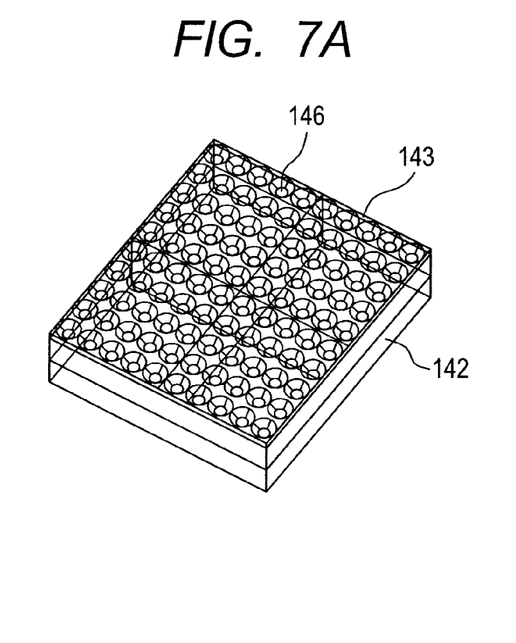
FIGS. 7A and 7B are views for showing other example, forming a recess portion on the surface of the disc (the wheel) member.
Figure 7B:
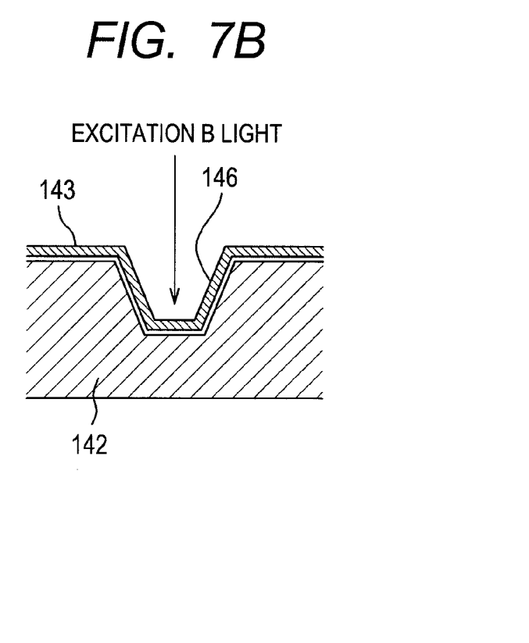

In this other example, a large number of miniature recess portions 146 are formed on the surface of the disc-like base member 142 building up the disc (or wheel) member 140, in particular, on the surface in the vicinity of the focus point "F", upon which the excitation light is incident (a portion of a circle of thick line in FIG. 5B), wherein in FIG. 7A shows an enlarged perspective view of a portion forming the miniature recess portions thereon, being cut out from the disc-like base member, and FIG. 7B shows an enlarged cross-section view of the base member including one (1) of those recess portions therein. And, as is apparent from those figures, the fluorescence surface 143 made of fluorescence layers is formed, covering over the miniature recess portions 146, e.g., the large number of cone-shaped dents or pits formed on the surface.

Figure 8A:
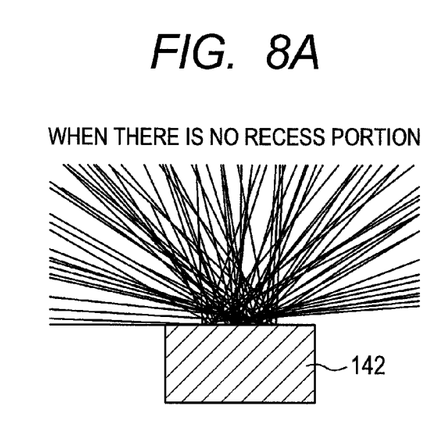
FIGS. 8A and 8B are views for showing scattering condition of the luminescence lights in the other example of the disc (or the wheel) member, in comparison with an example that does not form the recess portion thereon.
Figure 8B:
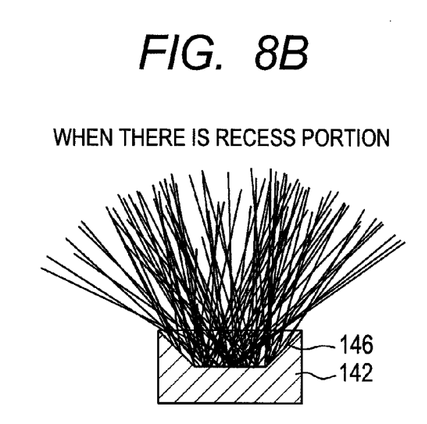

With the disc (or wheel) member 140 according to this other example, in comparison with the case where no such cone-shaped dents or pits is formed on an incident surface of the excitation light (cf. FIG. 8A), since the fluorescence lights emitting from the surface formed in that recess portion 146 upon the incidence of the excitation light are narrowed in the scattering directions thereof, as is shown in FIG. 8B (i.e., having a direction), then they can be caught easily by the reflection mirror (the reflector) 130 disposed in an upper portion thereof; for that reason, this may be advantageous from a viewpoint of an efficiency of utilizing the lights.

Figure 9:
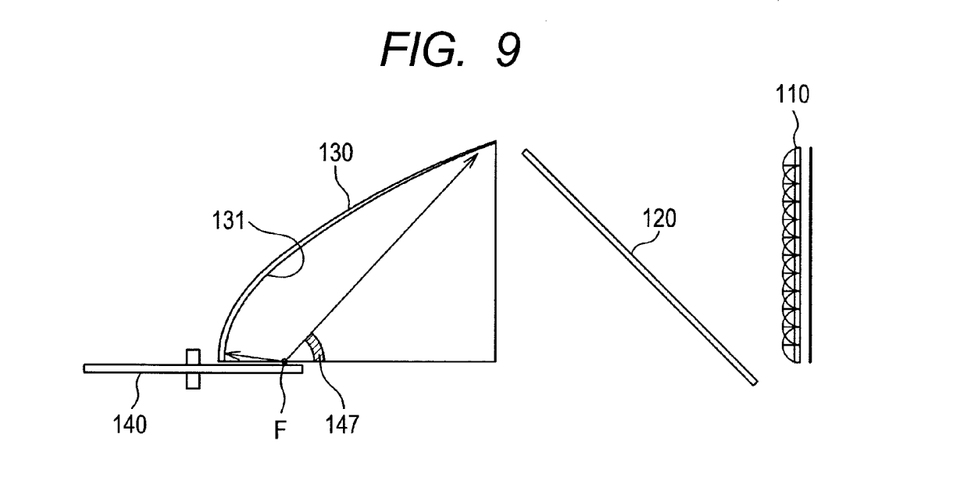
FIG. 9 is a view for showing further other example of the disc (or the wheel) member.

Further, other variation will be shown in FIG. 9. In this variation, as is apparent from the figure, on an outer periphery of the disc (or wheel) member 140 mentioned above is provided a spherical surface reflection mirror (a spherical surface reflector) 147, for reflecting the fluorescence lights thereupon, emitting from the vicinity of the focus point "F", upon which the excitation lights are incident, but not reaching onto the reflection surface 131. With provision of such spherical reflector 147, since it is possible to output almost of all of the fluorescence lights emitting from the vicinity of the focus point "F" through the reflection mirror (the reflector) 130, it would be advantageous from a viewpoint of the efficiency of utilizing the lights.

In the embodiments mentioned above, as a means for exchanging between the fluorescence surface 143 and the reflection surface 144, in time-sequence, successively, for the excitation light focused from the reflection mirror (the reflector) 130 in the vicinity of the focus point, there is applied disc (or wheel) member 140, with dividing the surface of the disc-like base member 142 into the plural numbers of segments, thereby forming the fluorescence surface 143 and the reflection surface 144; however, the fluorescence surface 143 and the reflection surface 144 may be formed on the surface of one (1) piece of rectangular base member, and this member may be shifted front and back; thereby it is possible to obtain the similar effect thereto.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A projection-type display apparatus, comprising:
   a light source unit, configured to emit an excitation light onto a nearly point-like area of a reflecting surface including a light emitting substance, the reflecting surface configured to reflect the excitation light received from the light source unit and also to emit an emission light from the light emitting substance, such that a white color light originates from the nearly point-like light source on the reflecting surface;

a light separation optic system, configured to receive the white color light that originates from the nearly point-like light source on the reflecting surface, and to separate the white color light into three primary color lights: red-color (R), green-color (G), and blue-color (B), and to emit the three primary color lights;

R, G and B light modulating portions, each of which is configured to modulate a respective one of R, G and B polarized separated lights, depending on a video signal;

a light composing unit, configured to compose optical images formed by the R, G and B light modulating portions; and a projecting portion, configured to project an enlarged version of the optical images.

2. The projection-type display apparatus, as described in the claim 1, wherein the white color light originating from the nearly point-like light source on the reflecting surface includes: the excitation light, and the emission light from the light emitting substance; and wherein the emission light comprises light emitted from a fluorescent substance excited by the excitation light.

3. The projection-type display apparatus, as described in the claim 2, wherein the fluorescent substance is configured to emit an emission light with a color relationship that is complementary to the excitation light, at least in terms of wavelength region.

4. The projection-type display apparatus, as described in the claim 3, wherein the excitation light comprises B-color light, and the emission light from the fluorescent substance comprises Y-color light.

5. The projection-type display apparatus, as described in the claim 4, wherein the white color light originating from the reflecting surface comprises a result of combining the B-color light emitted from a semiconductor laser element and the Y-color light emitted from the fluorescent substance.

6. The projection-type display apparatus, as described in the claim 5, further comprising:

a light flux capturing unit that includes the reflection surface.

7. The projection-type display apparatus, as described in the claim 1, wherein the white color light emitted from the light source unit comprises parallel or nearly parallel light rays.

8. The projection-type display apparatus, as described in the claim 1, wherein the R, G and B light modulating portions include transmission-type liquid crystal panels.

9. The projection-type display apparatus, as described in the claim 1, wherein the R, G and B light modulating portions include reflection-type liquid crystal panels.

10. The projection-type display apparatus, as described in the claim 1, wherein the R, G and B light modulating portions include digital mirror devices (DMD), each made by aligning plural numbers of micro-mirrors.

11. A projection-type display apparatus, comprising:

a light source means, for emitting an excitation light onto a nearly point-like area of a reflecting surface means including a light emitting substance, the reflecting surface means being for reflecting the excitation light received from the light source means and also for emitting an emission light from the light emitting substance, such that a white color light originates from the nearly point-like light source on the reflecting surface;

a light separation optic means, for receiving the white color light that originates from the nearly point-like light source on the reflecting surface, and for separating the white color light into three primary color lights: red-color (R), green-color (G), and blue-color (B), and for emitting the three primary color lights;

R, G and B light modulating means, each of which is for modulating a respective one of R, G and B polarized separated lights, depending on a video signal;

a light composing means, for composing optical images formed by the R, G and B light modulating means; and a projecting means, for projecting an enlarged version of the optical images.

12. The projection-type display apparatus, as described in the claim 11, wherein the white color light originating from the nearly point-like light source on the reflecting surface includes: the excitation light, and the emission light from the light emitting substance; and wherein the emission light comprises light emitted from a fluorescent substance excited by the excitation light.

13. The projection-type display apparatus, as described in the claim 12, wherein the fluorescent substance emits an emission light with a color relationship that is complementary to the excitation light, at least in terms of wavelength region.

14. The projection-type display apparatus, as described in the claim 13, wherein the excitation light comprises B-color light, and the emission light from the fluorescent substance comprises Y-color light.

15. The projection-type display apparatus, as described in the claim 14, wherein the white color light originating from the reflecting surface means comprises the result of combining the B-color light emitted from a semiconductor laser element and the Y-color light emitted from the fluorescent substance.

16. The projection-type display apparatus, as described in the claim 15, further comprising:

a light flux capturing means that includes the reflection surface means.

17. The projection-type display apparatus, as described in the claim 11, wherein the white color light emitted from the light source means comprises parallel or nearly parallel light rays.

18. The projection-type display apparatus, as described in the claim 11, wherein the R, G and B light modulating means include transmission-type liquid crystal panels.

19. The projection-type display apparatus, as described in the claim 11, wherein the R, G and B light modulating means include reflection-type liquid crystal panels.

20. The projection-type display apparatus, as described in the claim 11, wherein the R, G and B light modulating means include digital mirror devices (DMD), each made by aligning plural numbers of micro-mirrors.

* * * * *